G. WALTHER AND P. W. KLINGER.
STEEL TRUCK WHEEL.
APPLICATION FILED FEB. 25, 1920.

1,393,928.

Patented Oct. 18, 1921.
4 SHEETS—SHEET 3.

INVENTORS
George Walther,
Peter W. Klinger,
By Toulmin & Toulmin,
ATTORNEYS.

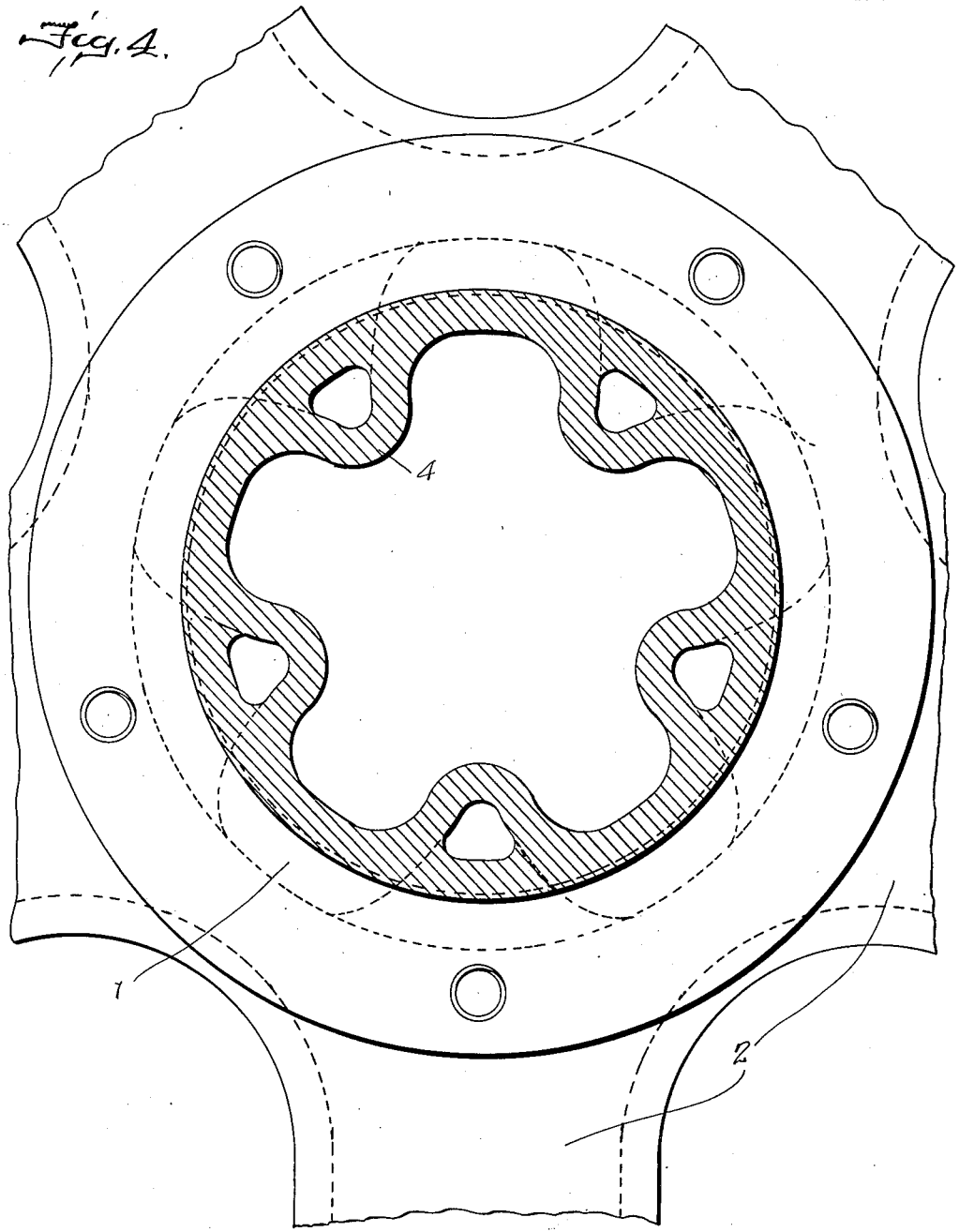

UNITED STATES PATENT OFFICE.

GEORGE WALTHER AND PETER W. KLINGER, OF DAYTON, OHIO, ASSIGNORS TO THE DAYTON STEEL FOUNDRY COMPANY, OF DAYTON, OHIO, A CORPORATION OF OHIO.

STEEL TRUCK-WHEEL.

1,393,928.  Specification of Letters Patent.  Patented Oct. 18, 1921.

Application filed February 25, 1920. Serial No. 361,196.

*To all whom it may concern:*

Be it known that we, GEORGE WALTHER and PETER W. KLINGER, citizens of the United States, residing at Dayton, in the county of Montgomery and State of Ohio, have invented certain new and useful Improvements in Steel Truck-Wheels, of which the following is a specification, reference being had therein to the accompanying drawing.

This invention relates to steel truck wheels and has for its object to provide an improved wheel of this type, adapted for detachable flanges and tires.

An object of the invention is to provide a wheel made up of several units which are more readily adaptable to the processes of molding and casting than a wheel cast integrally.

It is a further object of the invention to provide the main portion of the wheel, consisting of the hub and spokes of standard form and adapted to have rims of various shapes or types interchangeably mounted thereon, thus one wheel of standard size and type will serve for variable rim and tire mountings.

It is also an object to provide a wheel of novel hub construction, being strengthened by special metal reinforcings cast integrally with the hub whereby the wheel will be adapted to the maximum shock and stress to which truck wheels are subjected, and which will adapt the wheel of the present construction to the different uses contemplated in the interchangeability of its detachable flanges and tires, the wheels equipped with suitable tires being adapted for both light and heavy hauling.

In the accompanying drawings:

Fig. 4 is a sectional view taken transversely through the hub on the line 4—4 of Fig. 3.

Figure 1:
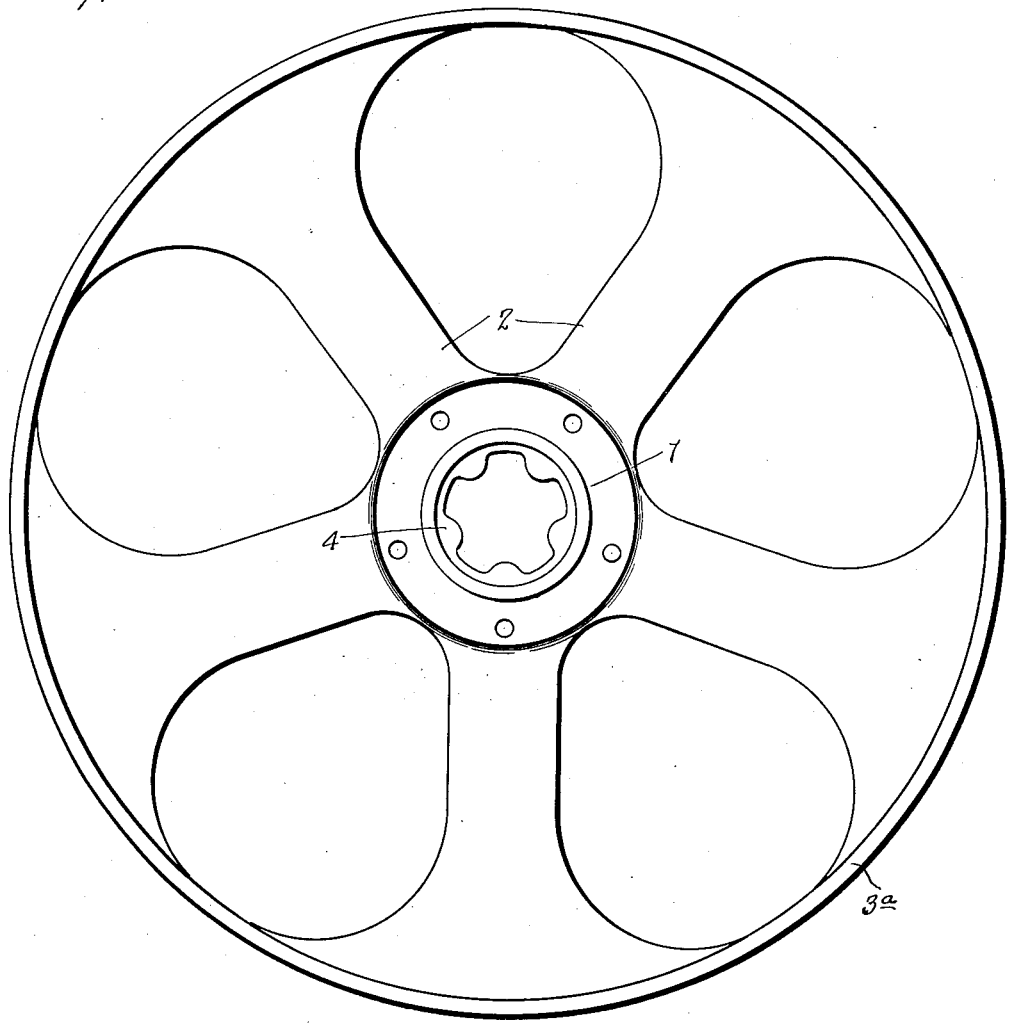
Figure 1 is a side elevation of the integrally cast hub and spokes of the present invention.

As shown in the drawings the improved wheel consists of an integrally cast hub 1 and spokes 2 and a fixed rim 3 adapted to be welded or riveted to the spokes; the hub having internally formed, hollow-cast trusses or bridges 4 of reinforcing metal adjacent each spoke, whereby the hub structure is materially strengthened without adding materially to the outward dimensions thereof, thus adapting the hub to withstand unusually heavy shocks and wheel stresses.

Figure 2:
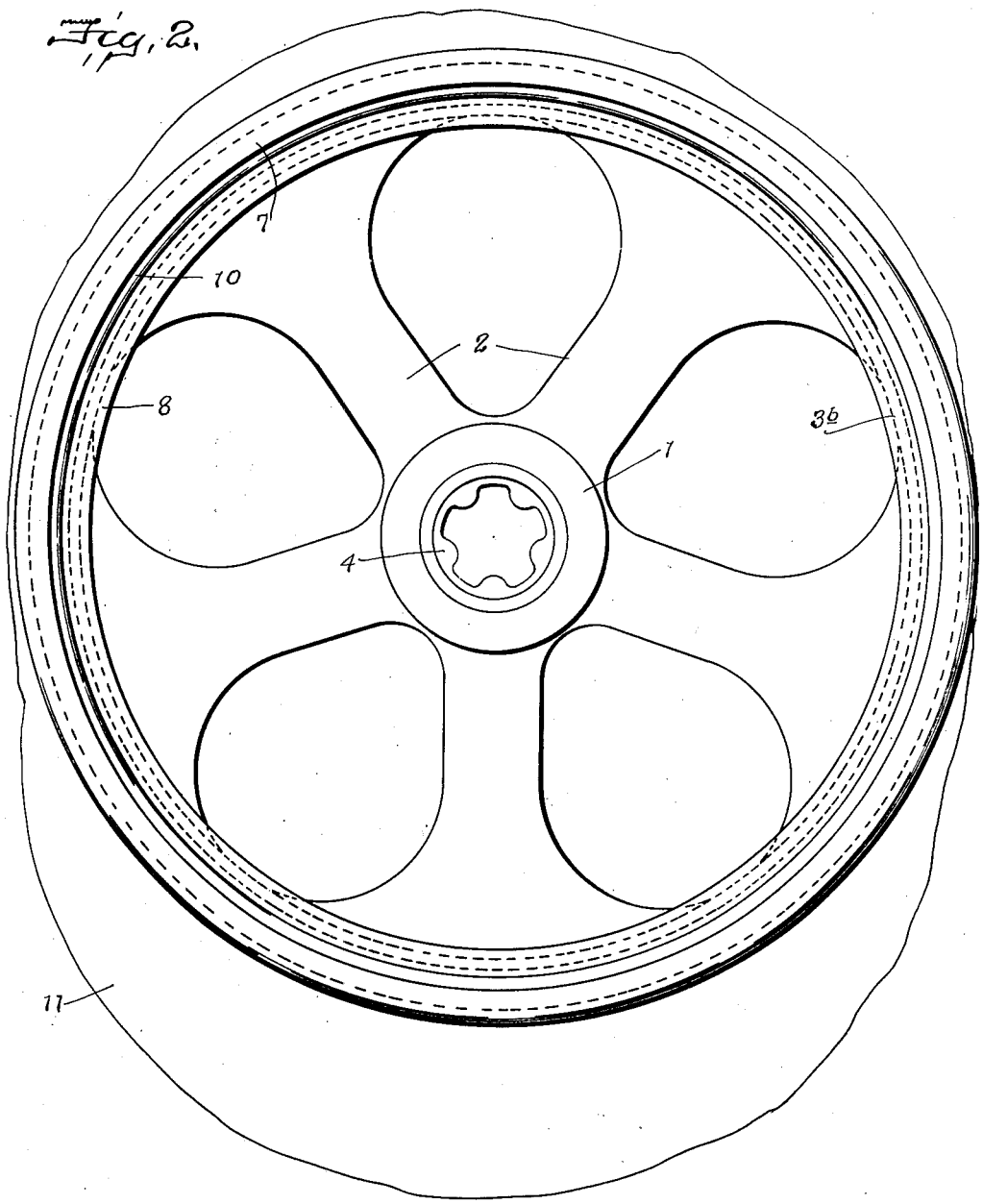
Fig. 2 is a side elevation of the complete wheel, with portions of the tire broken away and showing a modification of construction relative to the spokes.
Figure 3:
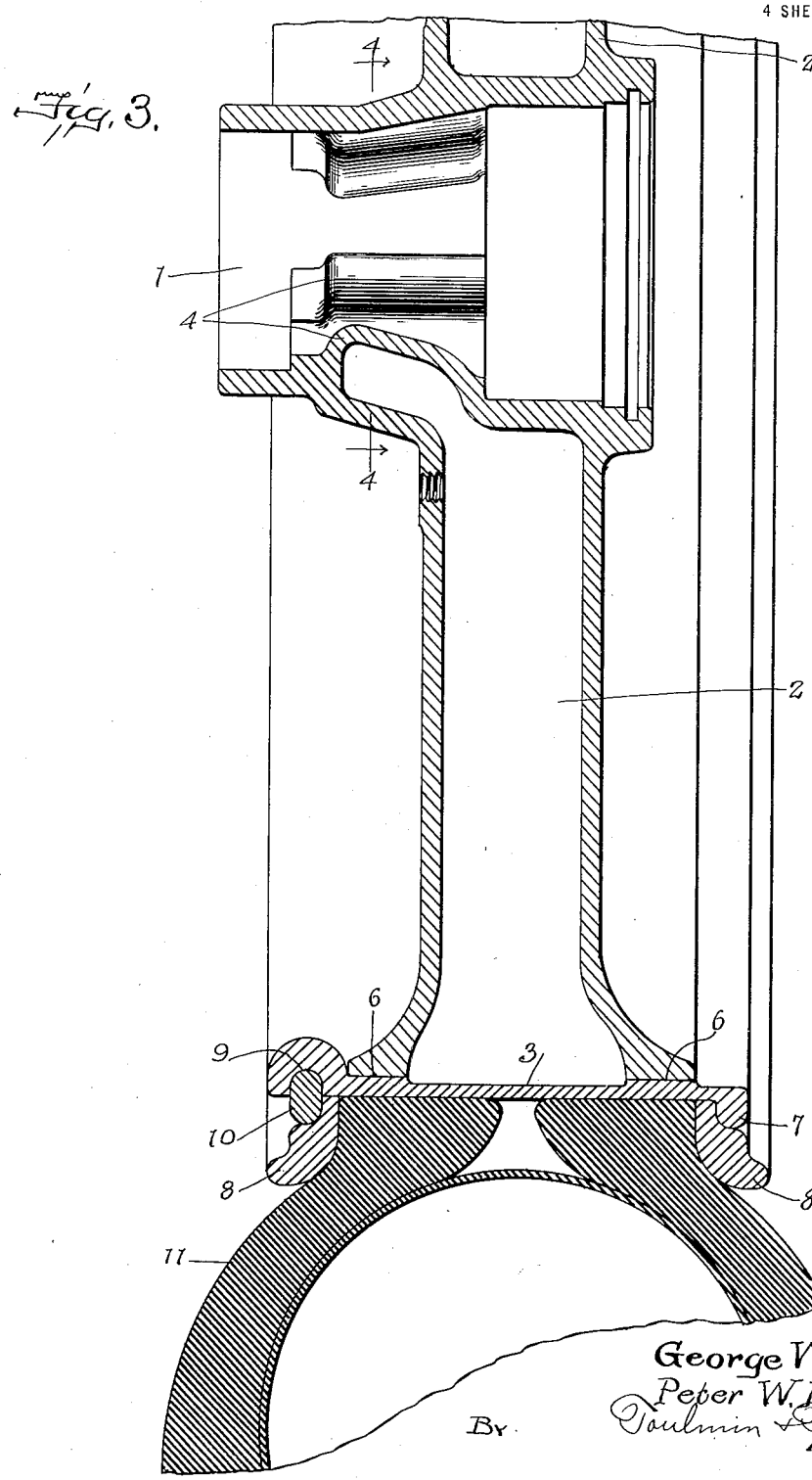
Fig. 3 is a sectional view taken longitudinally through the hub and a spoke and transversely through the rim.

The spokes are hollow and may be of any suitable shape in cross section. The outer ends of the spokes are curved outwardly in all directions from the longitudinal center thereof and are provided with a flange or pad $3^a$, which in the form shown in Fig. 2 are united in a continuous rim or band $3^b$ to provide suitable surface contact for the rim 3 which may be either welded or riveted to the spokes, the construction here shown illustrating the mounting of the rim by a welding operation.

The rim 3 may be of any suitable type adapted to the detachable flanges and tires to be mounted thereon. As here shown the rim 3 is a single piece circumferential casting or formed steel having pads 6 in the form here shown adapted to be machined to fit the ends of the spokes which are also machined to form a suitable welding or riveting connection.

One edge of the rim 3 is raised as at 7 to form a side support for one of the detachable flanges 8; the opposite edge of the rim 3 having a depression or circumferential channel 9 formed therein to receive a split mounting ring 10 which serves to hold the other demountable rim 8 in normal relation to the tire 11. Any suitable connections of standard construction may be employed to secure the adjacent ends of the rims 8 together to prevent spreading of the rims except when the same are to be demounted.

From the foregoing detailed description the novel features of construction and arrangement of our improved wheel will be readily understood. Various modifications may, of course, be made as to detail features without departing from the essential organization of the invention as defined and comprehended in the appended claims.

Having thus fully described our invention, what we claim as new and desire to secure by Letters Patent, is:—

1. A metal wheel consisting of integrally cast hub and spokes, hollow-cast arches of reinforcing metal formed within the hub and adapted to strengthen said hub, and a separate rim adapted to be secured to the outer free ends of said spokes.

2. A metal wheel consisting of integrally cast hub and spokes, hollow-cast arches of reinforcing metal formed within the hub adjacent each spoke and acting to strengthen the hub, and a separate rim adapted to be welded to the outer free ends of said spokes.

3. A metal wheel consisting of integrally cast hub and spokes of standard construction, hollow cast arches of reinforcing metal formed within the hub, said spokes being hollow, curved outwardly at their ends, and adapted to have rims of various types mounted thereon.

4. A metal wheel consisting of integrally cast hub and spokes of standard construction, said spokes being hollow, and curved outwardly at their ends; and a rim having inwardly projecting pads, one for each spoke, adapted to be welded to the ends of said spokes.

In testimony whereof, we affix our signatures.

GEORGE WALTHER.
PETER W. KLINGER.